Patented Sept. 26, 1939

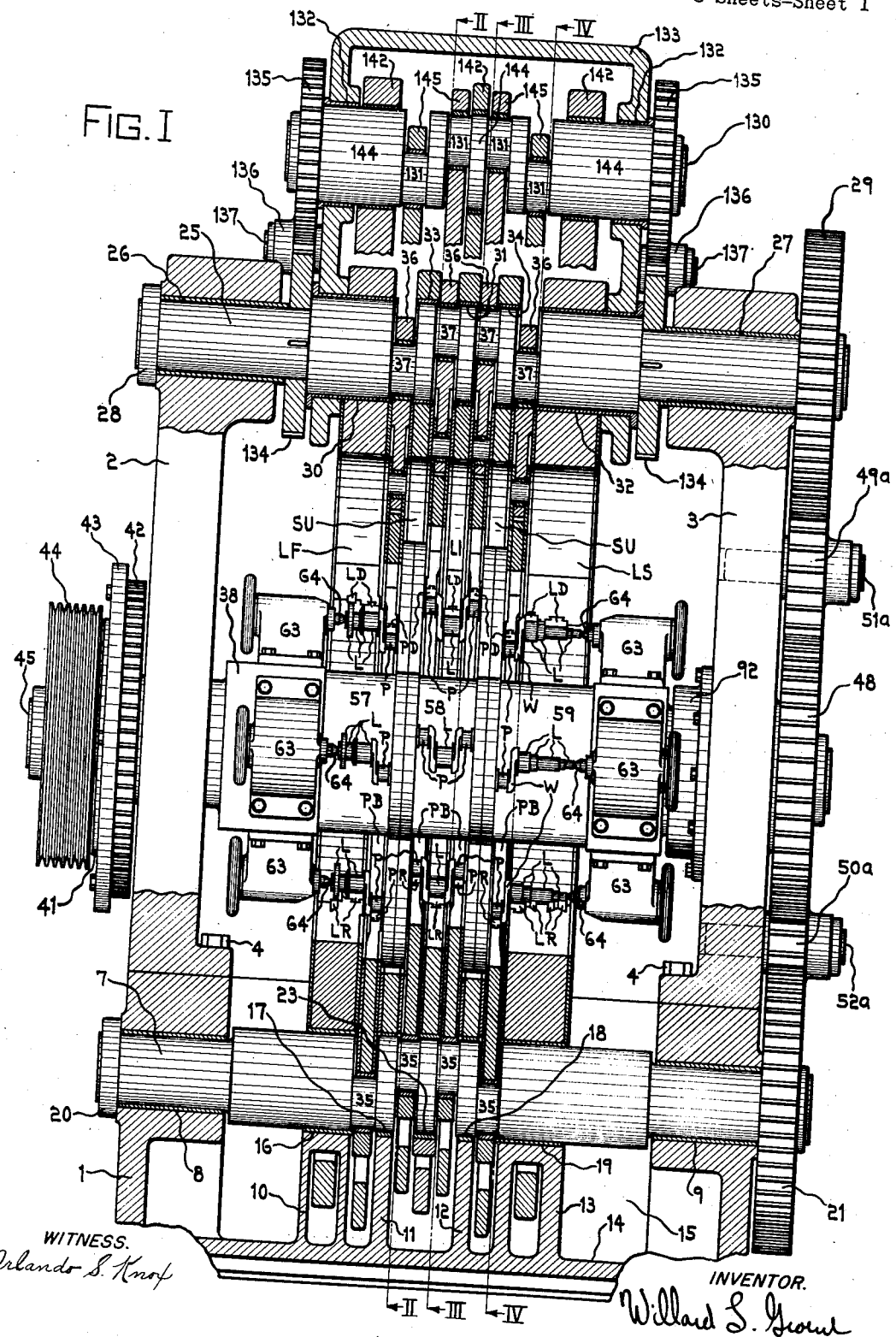

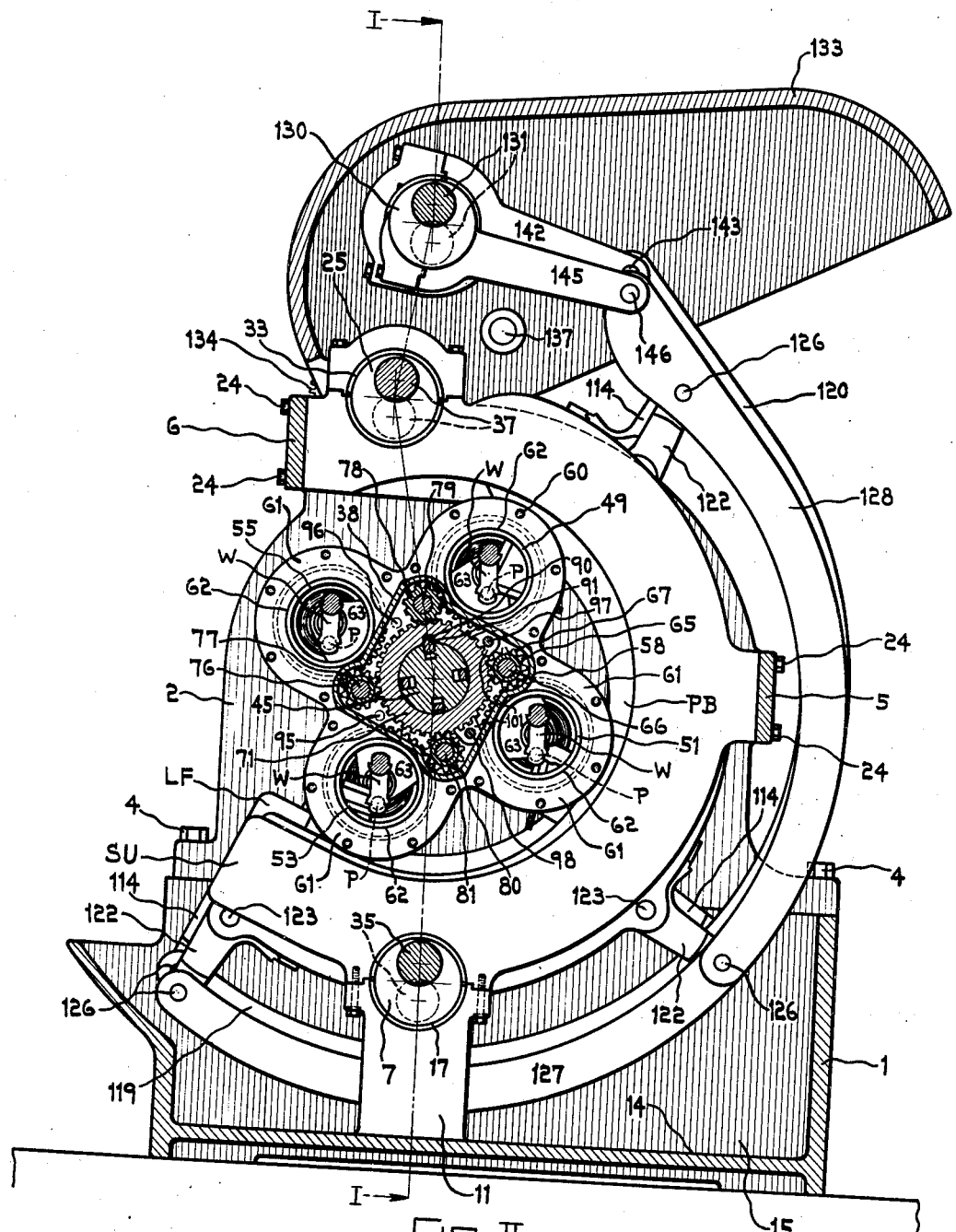

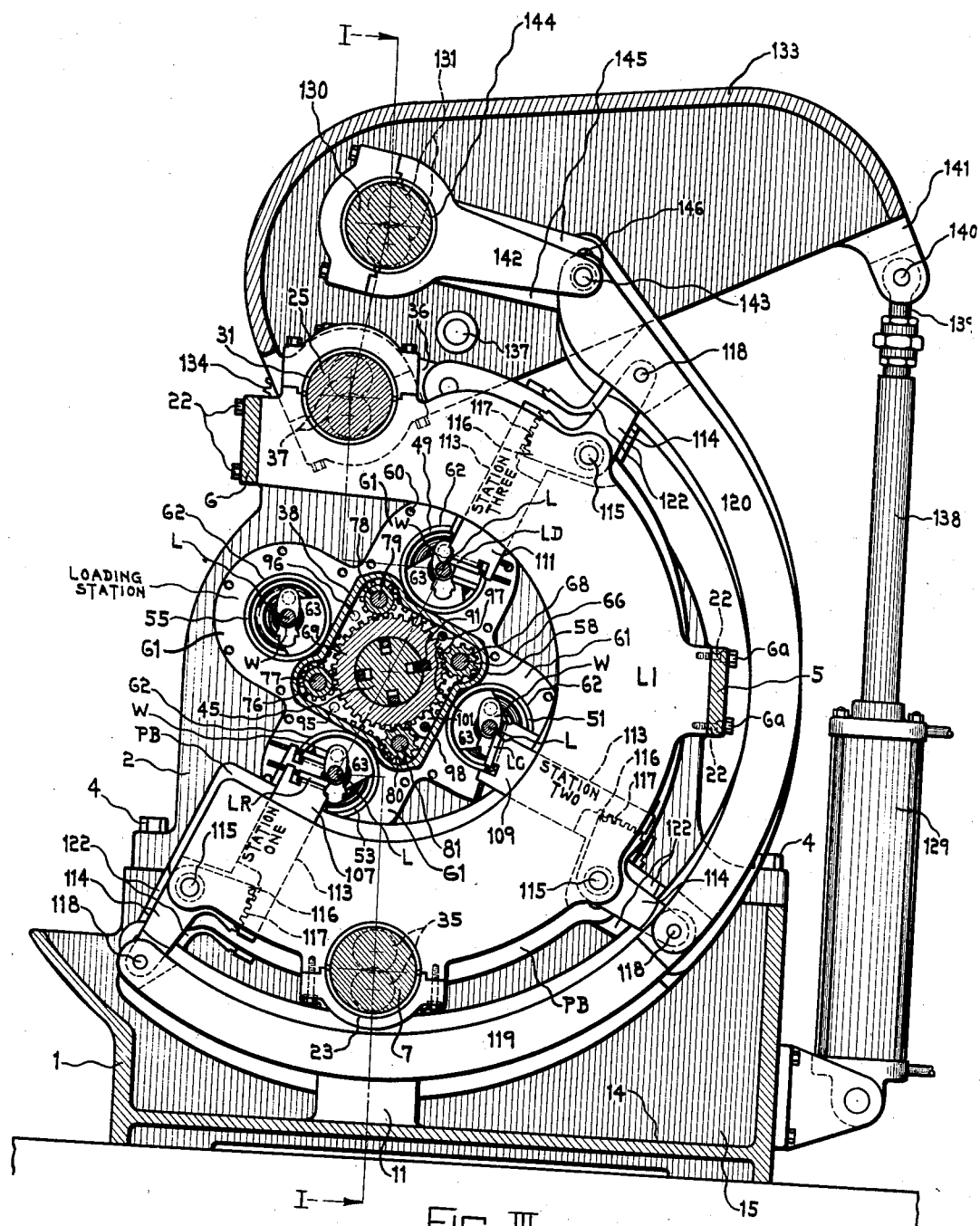

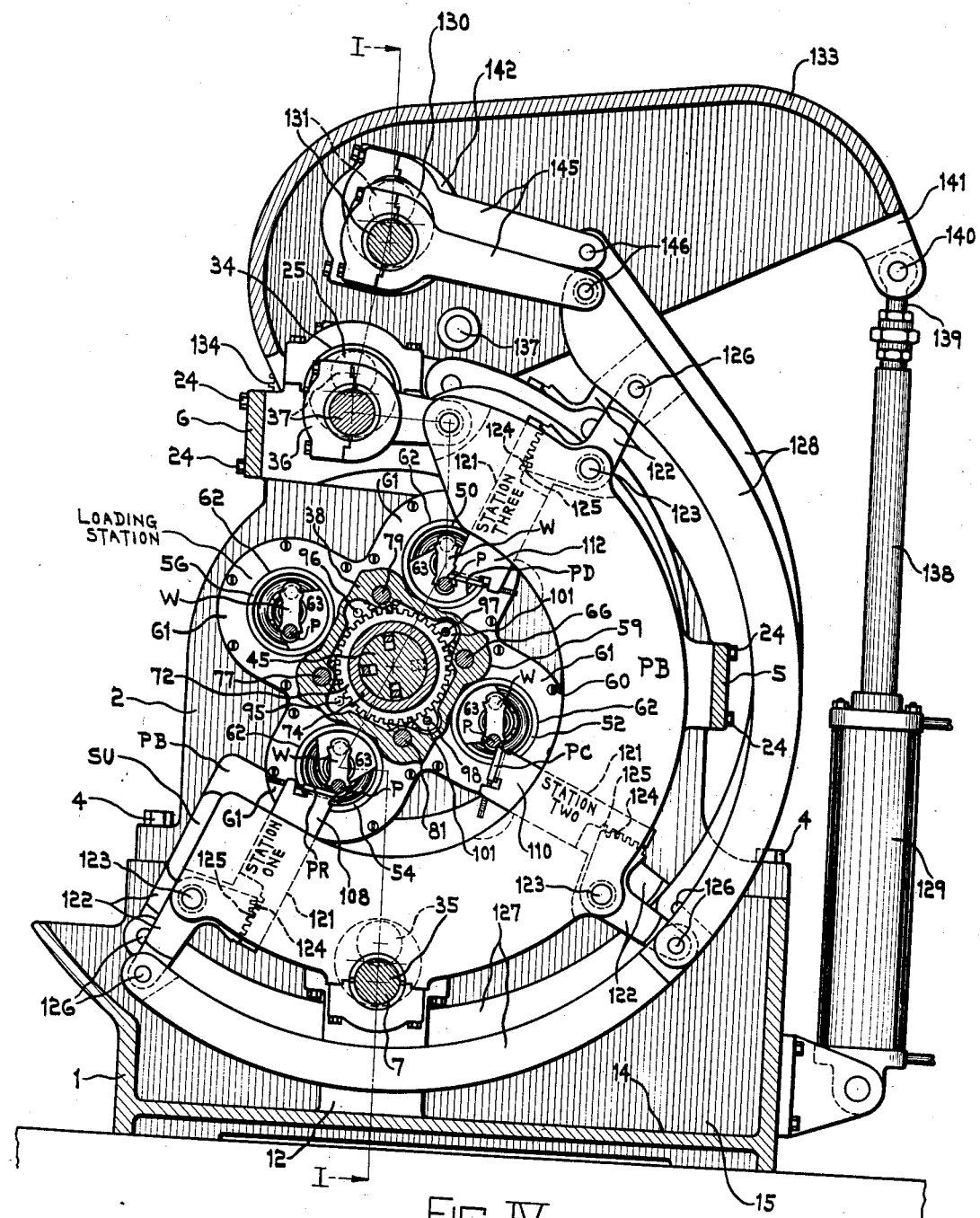

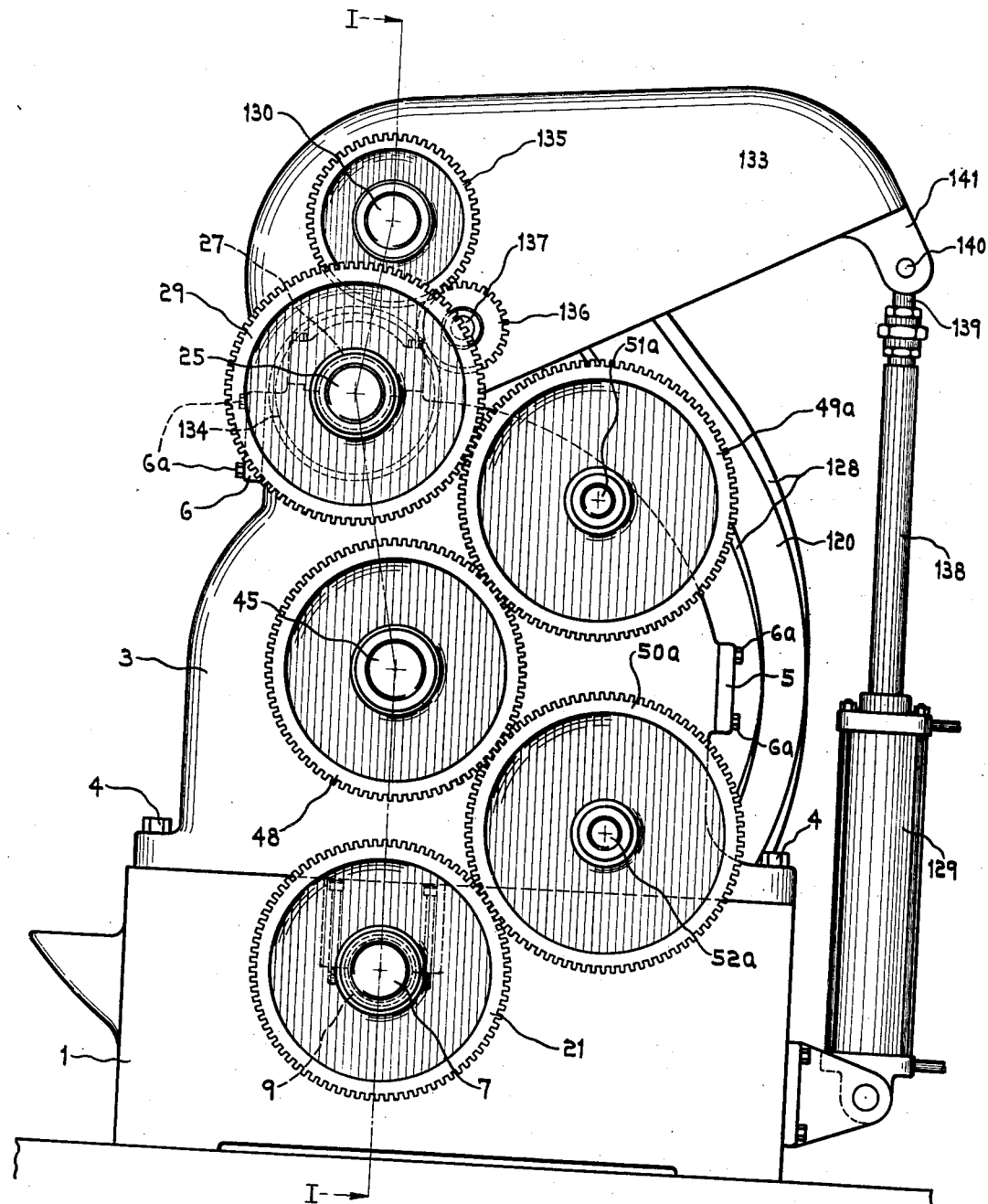

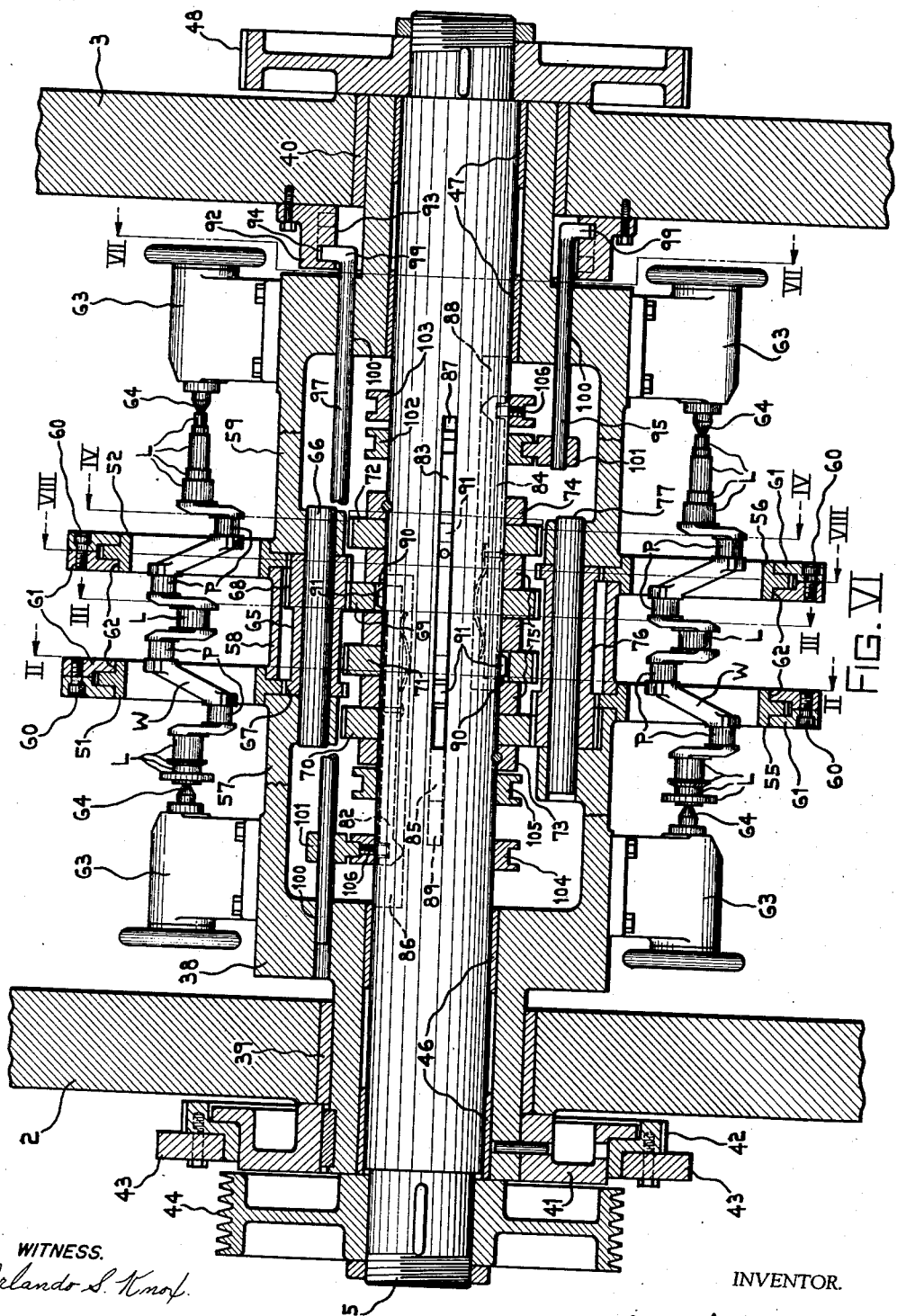

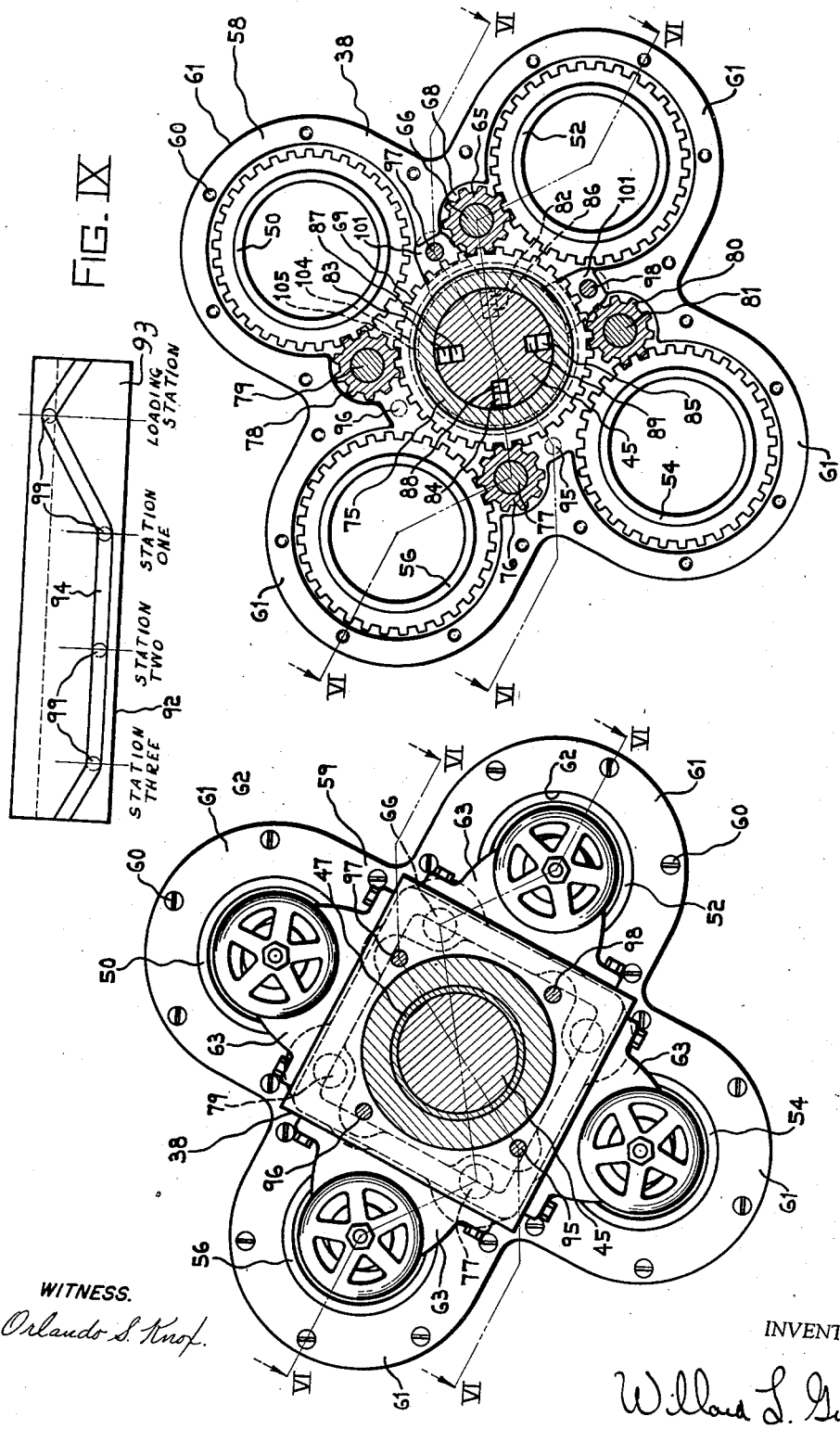

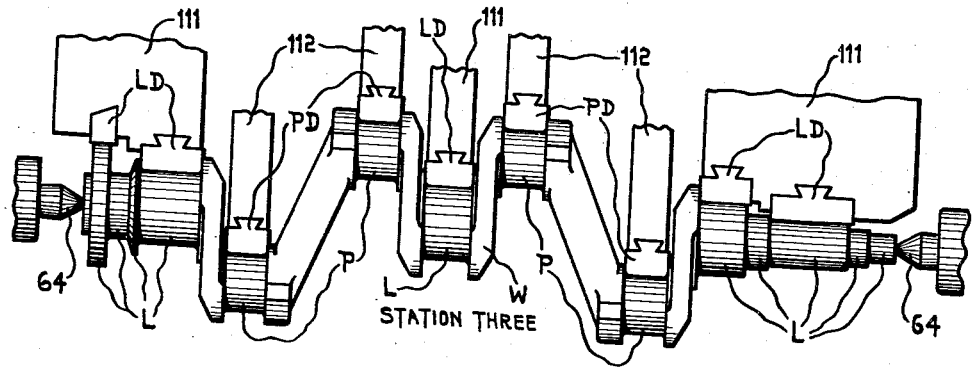
FIG. X
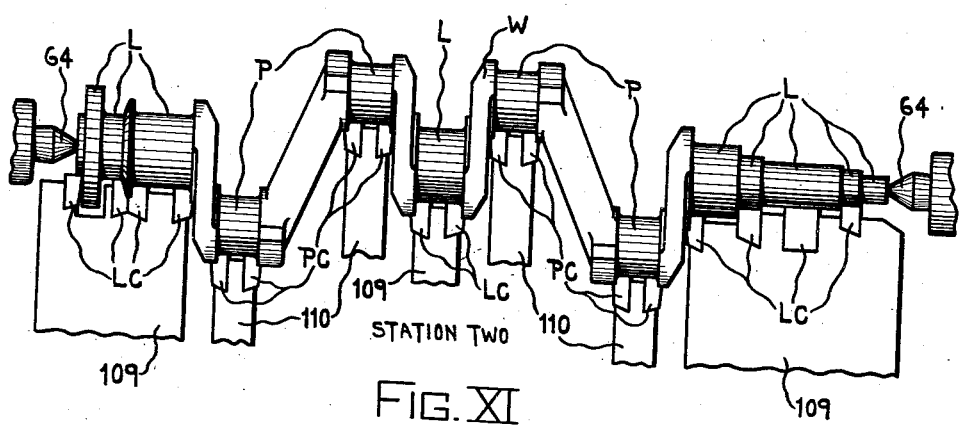
FIG. XI
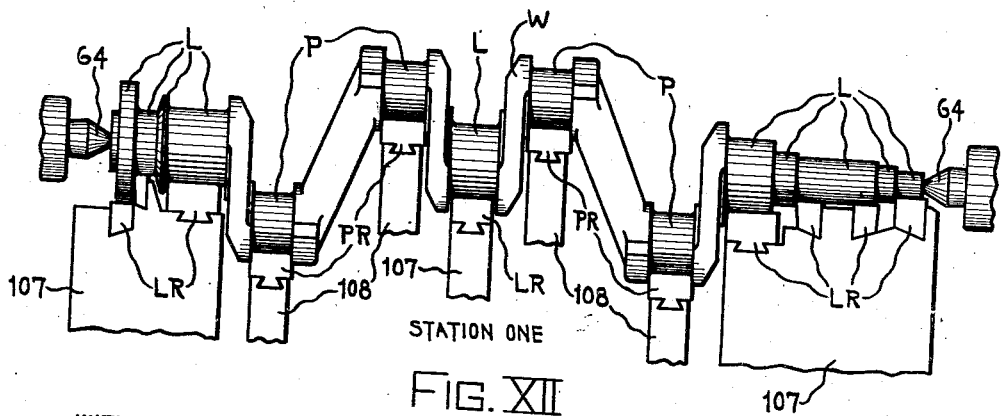
FIG. XII

2,174,084

UNITED STATES PATENT OFFICE 2,174,084

STATION TYPE PIN AND LINE BEARING LATHE

Willard L. Groene, Cincinnati, Ohio, assignor to The R. K. Le Blond Machine Tool Company, Cincinnati, Ohio, a corporation of Delaware Application April 4, 1938, Serial No. 199,801

54 Claims. (Cl. 29—38)

This invention pertains to crankshaft lathes, and more particularly to such type of lathes that are adapted to turning the bearing portions of crankshafts. More particularly this lathe is adapted to turn all of the line bearings, including the flange and stub end portions and all of the pin bearings simultaneously in a progressive machining operation.

Heretofore it has always been considered impossible to provide a practical lathe for simultaneously machining all of the bearing portions of a crankshaft at one time, particularly in a progressive manner because of believed insurmountable difficulties in providing the proper means necessary for indexing the various work spindles at the various work stations while at the same time allowing the work spindles at the loading station to be stopped and restarted again in proper relation to the tool control means for the pin turning tools of the lathe. It was also believed impractical to construct such a lathe for progressively machining all of the bearing portions of crankshafts because of the difficulty of providing an adequate and simple feeding mechanism for actuating all of the cutting tools simultaneously. With these difficulties clearly in mind I have conceived of an arrangement, set forth herein, which completely solves these problems of the past and provides a machine of comparatively simple arrangement and effectiveness for progressively machining all of the bearing portions of crankshafts at a series of work stations.

This machine incorporates certain features involved in copending applications Serial Number 63,104, filed February 10, 1936; Serial Number 80,204, filed May 16, 1936; and Serial Number 177,953, filed December 3, 1937 and combines them in such a unique way as to produce a machine of much higher efficiency and productiveness for machining the bearing portions of crankshafts than ever before produced.

An object of my invention is to provide a lathe wherein a plurality of work crankshafts may be placed and during the operation of said lathe all of the line bearings, including the flange and stub ends, and all of the pin bearings may be progressively machined in a series of cutting operations at a plurality of work stations.

Another object of my invention is to provide in a lathe means for chucking and rotating a plurality of crankshafts intermediate their ends and tool means adapted to simultaneously machine all of the line bearings, including the flange and stub ends, and all of the pin bearings of said crankshafts.

Another object is to provide a multiple spindle indexing center drive crankshaft lathe in which are incorporated cutting tools adapted to simultaneously machine all of the line bearings, including the flange and stub ends, and all of the pin bearings of crankshafts in the lathe at a plurality of indexed work stages so as to progressively machine all of the bearings and associated portions of said crankshafts.

A still further object is to provide a lathe wherein a work piece having both concentric and eccentric portions to be machined is supported in a work spindle carried on an indexing carrier whereby said work piece is progressively presented to cutting tools at a plurality of work stations to simultaneously machine all of said concentric and eccentric portions of said work piece in a progressive manner.

And still another object is to provide a crankshaft lathe wherein a plurality of crankshafts are supported and rotated intermediate their ends on an indexing carrier which carrier is indexed to a plurality of work stations at which all of the line bearings, including the flange and stub ends, and all of the pin bearings of said crankshaft are simultaneously machined in a progressive manner.

It is also my intention to provide a lathe having an indexing carrier upon which are mounted a plurality of work spindles and to have both stationary and orbitally moving tool carriers movable relative to work pieces in said work spindles.

It is also a point of my invention to provide a lathe having a plurality of center drive chucking devices adapted to grip and support and to rotate a plurality of crankshafts intermediate their ends and to index a crankshaft to a plurality of work stations at which are provided tools which operate each side of said center drive chucking devices and between said center drive chucking devices and which are adapted to simultaneously machine both the line bearing portions and the pin bearing portions of said crankshafts in said lathe.

Another object of my invention is to provide in a lathe having an indexing carrier upon which are mounted a plurality of work spindles and in which there are orbitally moving tool carriers adapted to engage the work pieces in said spindles to provide means whereby the work spindles may be stopped and restarted in a definite indexed position in proper synchronism with the orbitally moving tool carriers.

Another object of my invention is to provide in a lathe having an indexing work carrier upon which is mounted a plurality of work spindles and in which there are both stationary and orbitally moving tool carriers located at a series of indexed stages and in which there is a loading station at which there are no cutting tools, to provide means whereby the work spindles may be automatically stopped as they enter said loading station and whereupon they are automatically started in a definite indexed position relative to said orbitally moving tool carriers when said spindles are indexed out of said loading station to a work station.

A still further object of my invention is to provide a lathe having an indexing work carrier upon which is mounted a plurality of work spindles and in which there are both stationary and orbitally moving tool carriers having cutting tools located at a plurality of work stations to provide means whereby a single feeding means may simultaneously feed all of the cutting tools at all of said work stations simultaneously from a single source of power.

Further objects of the invention will appear from the detailed description of the drawings in which:

Figure I is a diagrammatic section substantially on the line I—I of Figures II, III, IV, and V.

Figure II is a vertical transverse section through the lathe on the line II—II of Figures I and VI.

Figure III is a vertical transverse section through the lathe on the line III—III of Figures I and VI.

Figure IV is a vertical transverse section through the lathe on the line IV—IV of Figures I and VI.

Figure V is a right hand end elevation of the lathe showing the synchronizing gearing interconnecting the various master crankshafts and the center drive indexing drum mechanism.

Figure VI is a diagrammatic section through the center drive indexing drum substantially on the lines VI—VI of Figures VII and VIII.

Figure VII is a vertical transverse section through the center drive indexing drum on the line VII—VII of Figure VI.

Figure VIII is a vertical transverse section through the center drive indexing drum on the line VIII—VIII of Figure VI.

Figure IX is a diagrammatic layout of bore in the control cam for operating the spindle starting and stopping mechanism.

Figure X is an enlarged view showing the cutting tools at work station three applied to finish machine the pin bearings and line bearings and related portions on a crankshaft.

Figure XI is an enlarged view showing the cutting tools at work station two applied to cheeking the webs and roughing out the fillets of the various bearing portions of a crankshaft.

Figure XII is an enlarged view showing the cutting tools at work station one applied to roughing out the various diameter portions of a crankshaft.

The lathe comprises a base 1 upon the ends of which are mounted housings 2 and 3 and bolted in place thereon by suitable bolts 4. The housings 2 and 3 are tied together at the rear of the machine by a tie bar 5 and, also, are tied together at the front at their upper portions by a tie bar 6 appropriately fixed to faces on the housings by bolts 6a.

In the base 1 of the lathe is journaled the lower master crankshaft 7 in appropriate bearings 8 and 9, the crankshaft 7 also being supported intermediate these bearings on supports 10, 11, 12, and 13 projecting upwardly from the floor 14 of the chip and coolant compartment 15 of the base 1 and carrying the respective bearings 16, 17, 18, and 19. The flange end line bearing tool unit LF is mounted on the support 10 and forms the upper half of the bearing 16 for the crankshaft. Similarly the stub end line bearing tool unit LS is mounted on the support 13 forming the upper half of bearing 19. Mounted on the supports 11 and 12 are the spacer units SU which form the upper half of the bearings 17 and 18. The master crankshaft 7 is confined axially of the base 1 by the adjusting collar 20 and its driving gear 21.

The line bearing tool units LF and LS and also the intermediate line bearing tool unit LI are appropriately attached to the tie bars 5 and 6 by bolts 22, the unit LI being supported at its lower end by a bearing 23 floatingly mounted on the master crankshaft 7. The spacer units SU are likewise attached to the tie bars 5 and 6 by bolts 24.

An upper master crankshaft 25, which is a replica of the lower master crankshaft 7 so far as the position and stroke of the crank pins are concerned, is journaled in bearings 26 and 27 carried in the upper part of the housings 2 and 3, the crankshaft being confined from axial movement by the adjusting collar 28 and its driving gear 29, which gear is identically the same, as to pitch diameter and number of teeth, as the gear 21 on the lower master crankshaft 7. The upper master crankshaft 25 is also supported in bearings 30, 31 and 32 in the line bearing tool units LF, LI, and LS, and in bearings 33 and 34 in the spacer units SU.

The pin bearing tool units PB are journaled directly on the crank pins 35 of the lower master crankshaft 7 and through the linkage connections 36 on the crank pins 37 of the upper master crankshaft 25 in a manner set forth in Patent Re. 18,662 dated November 22, 1932 and as shown in copending application Serial Number 63,104 filed February 10, 1936.

Referring particularly to Figure VI, in the housings 2 and 3 is journaled the center drive indexing drum 38 in the respective bearings 39 and 40. The drum 38 has attached to it adjacent the bearing 39 the indexing disc 41 which carries the indexing gear 42 and indexing slot blocks 43 which cooperate with any suitable indexing mechanism for example of a character fully set forth in copending application Serial Number 80,204 filed May 16, 1936.

Power for rotating the center drive work spindles and the master crankshafts is delivered to the V-belt pulley 44 fixed on the drive shaft 45 which is journaled in bearings 46 and 47 in the drum 38 and coaxial therewith. On the opposite end of the shaft 45 from the pulley 44 is fixed the gear 48 having identical pitch and number of teeth as the gears 21 and 29 on the lower and upper master crankshafts 7 and 25, respectively. Idler gears 49a and 50a, Figure V, rotatably mounted on the respective studs 51a and 52a fixed in the housing 3 interconnect the gears 21, 29, and 31 so that the master crankshafts 7 and 25 and the shaft 45 rotate in synchronism. The gear 48 and the indexing disc 41 serve to axially confine the drum 38 within the housings 2 and 3 while the gear 48 and the driving pulley 44 serve to axially confine the shaft 45 in the drum 38.

Noting particularly Figures II, III and IV, the drum 38 is provided with four center drive work spindles each comprising a pair of center drive ring gears 49 and 50; 51 and 52; and 53 and 54; and 55 and 56. These ring gears are shown without their chucking mechanism gripping the work crankshafts W for the sake of simplicity. A chucking arrangement of a character set forth in Patent 2,030,020 dated February 4, 1936 should preferably be used.

The drum 38 consists of three portions comprising the left hand portion 57, the central spool-shaped portion 58, and the right hand portion 59. These three portions are securely held together by the screws 60 which pass through the various flanged portions 61 which form the bearings 62 for the center drive ring gears. By this construction the assembly of the ring gears and the associated driving mechanism in the drum 38 is greatly facilitated while at the same time maintaining a maximum of rigidity for the drum as a whole.

Each of the work spindles also has a pair of tailstocks 63 having lathe centers 64 for supporting the ends of the crankshafts W.

Associated with the indexing center drive work spindles are the work stations one, two and three and a loading station as indicated on Figures III and IV. A unique arrangement is provided for automatically stopping rotation of the center drive ring gears of each work spindle when they are indexed into the loading station and to automatically start up said spindles as they are indexed to the work stations in a definite predetermined indexed position relative to the other work spindles and master crankshafts of the lathe. This mechanism is best shown in Figures VI and VIII. Taking the work spindle having the ring gears 51 and 52, which is shown at work station two, these ring gears are interconnected for synchronous rotation by the double idler pinion 65 rotatably mounted on the shaft 66 fixed in the portions 57 and 59 of the drum 38 and having identical pinions 67 and 68 engaging the ring gears 51 and 52 respectively. The pinion 68 has a relatively wide face which is engaged by the driving gear 69 rotatably mounted on the drive shaft 45 and having the same pitch and number of teeth as the ring gears 51 and 52 so that a one to one ratio is provided between the driving gear 69 and the ring gears 51 and 52 for synchronous rotation of said driving gear and ring gears.

The ring gears of the other three work spindles are identically like the ring gears 51 and 52 and on the shaft 45 are rotatably mounted the driving gears 70, 71, and 72 which are identically like the gear 69, all of the gears 69, 70, 71, and 72 are confined axially on the shaft 45 by the collars 73 and 74 fixed on the shaft and the spacing collars 75 between the gears. The center drive ring gears 55 and 56 are driven by the driving gear 70 through the double pinion 76 rotatably mounted on the shaft 77 fixed in the drum 38 in a manner as described for the ring gears 51 and 52. And similarly gear 71 drives the center drive ring gears 49 and 50 through the double pinion 78 rotatably mounted on the shaft 79 fixed in the drum and the gear 72 drives the center drive ring gears 53 and 54 through the double pinion 80 rotatably mounted on the shaft 81 fixed in the drum 38. Thus all of the center drive ring gears and the driving gears 69, 70, 71, and 72 are adapted to rotate in synchronism.

Means are provided for automatically connecting or disconnecting the various driving gears 69, 70, 71, and 72 from the drive shaft 45 in a definite indexed position relative to said shaft comprising a dive key mechanism of a character best shown in Figure 6 of Patent 2,097,375 dated October 26, 1937. Each of the driving gears 69, 70, 71, and 72 have the respective dive keys 82, 83, 84, and 85 associated with them in slots 86, 87, 88, and 89 extending axially in the drive shaft 45. In each of said driving gears is provided a single slot 90 which may be engaged by the tongue 91 of the dive keys so that these driving gears may be locked in driving relationship on the shaft 45 in only one predetermined accurately indexed position on the shaft 45 and since the shaft 45 rotates in synchronism with the master crankshafts as described the spindles when rotating will be in proper indexed relation to the orbitally moving parts of the lathe.

In order to automatically cause the spindles entering the loading station to be stopped and to be started up again as they leave the loading station a circular cam 92 is fixed on the housing 3 with its bore 93 concentric with the axis of rotation of the drum 38. In the bore 93 is provided a cam slot 94 as shown in Figure IX which indicates the position of the cam slot relative to the various work stations and the loading station. Shifter rods 95, 96, 97, and 98 have projecting ends 99 which engage in the cam slot 94 and are thereby caused to be reciprocated axially of the drum 38 in the bearings 100 as predetermined by the indexed position of the drum 38. These shifter rods are connected through yokes 101 to the shifter spools 102, 103, 104, and 105 slidably mounted on and rotated by the shaft 45 and having set screws 106 engaging the dive keys 82, 83, 84, and 85 so that when the shifter rods are moved to the left in Figure VI the dive keys will be engaged with the driving gears and when moved to the right the driving gears will be disengaged from the driving action of the shaft 45. The cam 92 is so arranged that the shifter rod of a work spindle will be automatically shifted to disengaged position only when that particular work spindle is at the loading station.

One arrangement of the cutting tools at the various work stations is that shown in Figures X, XI, and XII. Figure XII shows the cutting tools LR at station one for roughing the line bearing portions L of the crankshaft W which are carried on the tool bars 107. The cutting tools PR are mounted on the tool bars 108 and are adapted to roughing out the crank pins P.

In Figure XI the cutting tools at station two are shown. The tools LC mounted on the tool bars 109 perform cheeking operations and complete the roughing operations of station one. The cutting tools PC mounted on the tool bars 110 cheek the webs and rough out the fillets associated with the crank pins P.

In Figure X the cutting tools at station three are shown. The tools LD mounted on the tool bars 111 finish the line bearing diameters and their associated fillets. The cutting tools PD mounted on the tool bars 112 finish the crank pin diameters and their associated fillets.

The tool bars 107, 109, and 111 are slidably mounted in suitable guideways 113, Figure III, in the line bearing tool units LF, LI, and LS and are actuated by bell crank levers 114 pivotally mounted on pins 115 fixed in said units and having rack teeth 116 on the end of one of their arms engaging racks 117 formed on the tool bars. The ends of the other arms of the bell cranks 114 are pivotally connected by pins 118 to the curved actuating bars 119 and 120. It will thus be seen that by moving the bars 119 and 120 to cause the bell cranks 114 to swing on their pivots 115 the tool bars 107, 109, and 111 may be simultaneously actuated for movement relative to the crankshafts W in the lathe.

Noting particularly Figure IV, the tool bars 108, 110 and 112 are similarly actuated. These bars are slidably mounted in suitable guideways 121 in the pin bearing tool units PB and are actuated by bell crank levers 122 pivotally mounted on pins 123 fixed in said units and having rack teeth 124 on the end of one of their arms engaging racks 125 formed on the tool bars. The ends of the other arms of the bell crank 122 are pivotally connected by pins 126 to the curved actuating bars 127 and 128. By moving these bars 127 and 128 to cause the bell cranks 122 to swing on their pivots 126 the tool bars 108, 110, and 112 may be simultaneously actuated for movement relative to the crankshafts W in the lathe.

In order to properly, simultaneously actuate the bars 119 and 120 of the line bearing tool units and the bars 127 and 128 of the pin bearing tool units from a single source of feeding power such as the hydraulic feed cylinder 129, a feed crankshaft 130, having its crank pins 131 replicas of the crank pins of the master crankshafts 7 and 25 in so far as the position and stroke of said pins are concerned, is journaled in bearings 132 in the feeding cradle 133 which cradle in turn is journaled about the bearings 30 and 32 surrounding the master crankshaft 25, so that the feed crankshaft may be swung in an arc concentric with the axis of rotation of said crankshaft 25. A pair of identical gears 134 fixed on the master crankshaft 25 are adapted to drive a pair of identical gears 135 fixed on the feed crankshaft 130, which latter gears are the same as the gears 134 so far as pitch and number of teeth are concerned, through idler gears 136 rotatably mounted on studs 137 fixed in the cradle 133. The feed crankshaft therefore at all times rotates in synchronism with the master crankshaft 25 and likewise with master crankshaft 7.

The cradle 133 may be rocked on the bearings 30 and 32 by the cylinder 129 which is connected through its piston rod 138 and the eyebolt 139 and pin 140 to the tail portion 141 formed on the rear of said cradle. Conventional hydraulic operating means may be employed for actuating the cylinder 129 at appropriate rates of feeding.

Connecting links 142, which are pivotally mounted by pins 143 on the bars 120 and are journaled around the line bearing portions 144 of the feed crankshaft 130, connect the actuating bar 119 and 120 to the feed crankshaft so that rocking of the cradle 133 forwardly and upwardly by the cylinder 129 causes the tool bars 107, 109, and 111 to be fed into the work as shown in Figure III and vice versa, when the cradle is returned downwardly.

The actuating bars 128 are connected to the feed crankshaft 130 by the links 145 which are pivotally mounted on the bars 128 by the pins 146 and are journaled at their other ends on the crank pins 131 of the feed crankshaft 130. Since the feed crankshaft 130 is synchronized in its rotation with the master crankshafts 7 and 26 and therefore with the orbital motion of the pin bearing tool units PB, the proper relationship between the links 145 and the actuating bars 128 will at all times be maintained so as to in no way effect the normal feed movements produced by the rocking of the cradle 133 in feeding the tool bars 108, 110, and 112 relative to the work W. By this arrangement both the line bearing and pin bearing cutting tools are simultaneously fed to the work pieces at all of the work stations and by means of a single source of feeding power.

Having fully set forth and described my invention what I claim and desire to secure by United States Letters Patent is:

1. A multiple spindle machine, comprising a rotatable carrier member, a series of work spindles mounted on said member, means on the work spindles for chucking and rotating work pieces having concentric and eccentric portions to be machined, stationary and orbitally moving tool units having tools adapted to be fed relative to said portions, means for rotating said carrier member, means for rotating said work spindles, means for actuating said orbitally moving tool units and means for causing said relative feeding of said tools.

2. A multiple spindle machine, comprising a rotatable carrier member, a series of work spindles, each having center drive chucking mechanism and centers, mounted on the carrier member, stationary and orbitally moving tool units having tools adapted to be fed relative to said work spindles, means for rotating said carrier member, means for rotating the chucking mechanism, and means for feeding said tools.

3. A multiple spindle machine comprising a rotatable carrier member, a series of work spindles mounted on the carrier member, stationary and orbitally moving tool units having tools located at indexed stages adapted to respectively engage concentric and eccentric portions of work pieces held in the work spindles, means for rotating the carrier member selectively to said stages, means for actuating said orbitally moving tool units and means for rotating the work spindles at said stages.

4. A multiple spindle machine comprising a rotatable carrier member, a series of work spindles mounted on the carrier member each having a center drive chucking device and centers, stationary and orbitally moving tool units having tools located at indexed stages adapted to respectively engage concentric and eccentric portions of said work pieces held in the work spindles, means for rotating the carrier member selectively to said stages, means for actuating said orbitally moving tool units and means for rotating the chucking devices at said stages.

5. A multiple spindle machine comprising a rotatable carrier member, a series of work spindles each having a plurality of center drive chucking devices mounted on the carrier member, stationary and orbitally moving cutting tools located at selected stages adapted to engage concentric and eccentric portions of work held in said work spindles, means for rotating the carrier member to bring said work spindles selectively to said stages, and means for rotating the chucking devices at said stages.

6. A multiple spindle machine comprising a rotatable carrier member, a series of work spindles each having a plurality of center drive chucking devices and centers mounted in the carrier member, stationary and orbitally moving cutting tools located at selected stages adapted to engage concentric and eccentric portions of work held in said work spindles, means for rotating the carrier member to bring said work spindles selectively to said stages, and means for rotating the chucking devices at said stages.

7. In a lathe, a rotatable member carrying a plurality of work holders, a series of work stations, means for rotating said rotatable member to bring said work holders selectively to said stations, orbitally moving tool units having cutting tools at said work stations for machining eccentric portions on work pieces in said work holders, tool control means for said tool units, and means for actuating said work holders and tool control means in synchronism.

8. In a lathe, a rotatable member carrying a plurality of work holders, a series of work stations, means for rotating said rotatable member to bring said work holders selectively to said stations, stationary and orbitally moving tool units having cutting tools at said work stations for machining concentric and eccentric portions on work pieces in said work holders, tool control means for said tool units for machining said eccentric portions, means for feeding all of said tools relative to said work holders, and means for actuating said work holders and tool control means in synchronism.

9. In a lathe, a rotatable member carrying a plurality of work holders, a series of work stations, means for rotating said rotatable member to bring said work holders selectively to said stations, cutting tools at said work stations for machining eccentric portions on work pieces in said work holder, orbitally moving tool control means for said cutting tools, means associated with said tool control means for feeding said cutting tools relative to said work holders, and means for actuating said work holders and tool control means in synchronism.

10. In a lathe, a rotatable member carrying a plurality of independently operable work holders, means providing a lesser number of work stations than work holders to establish an accessible loading station, means for rotating said rotatable member to bring said work holders selectively to said stations, cutting tools at said work stations for machining eccentric portions on work pieces in said work holders, tool control means for said cutting tools, means for starting and stopping rotation of said work holders when at said loading station, and means for actuating said work holders in synchronism with said tool control means when said work holders are at said work stations.

11. In a lathe, a rotatable member carrying a plurality of independently operable work holders, means providing a lesser number of work stations than work holders to establish an accessible loading station, means for rotating said rotatable members to bring said work holders selectively to said stations, cutting tools at said work stations for machining eccentric portions on work pieces in said work holders, tool control means for said cutting tools, means automatically operated by rotation of said rotatable member for starting and stopping rotation of said work holders when at said loading station, and means for actuating said work holders in synchronism with said tool control means when said work holdrs are at said work stations.

12. In a lathe, a rotatable carrier member, a series of work spindles each comprising a plurality of center drive chucking devices mounted on the carrier, orbitally moving tools adapted to be fed relative to eccentric portions to be machined on work in said spindles, some of said tools being located between said chucking devices, others located each side of said chucking devices, means for rotating the carrier member, means for rotating the chucking devices in synchronism with said tools, and means for feeding said tools relative to said work.

13. In a lathe, a rotatable carrier member, a series of work spindles each comprising a plurality of center drive chucking devices mounted on the carrier, stationary and orbitally moving tools adapted to be fed relative to concentric and eccentric portions to be machined on the work in said spindles, some of said tools being located between said chucking devices, others being located each side of said chucking devices, means for rotating the carrier member, means for rotating the chucking devices in synchronism with said orbitally moving tools, and means for feeding said tools relative to said work.

14. In a lathe, a rotatable carrier member, a series of work spindles each comprising a center drive chucking device and centers mounted on said carrier, orbitally moving tools adapted to be fed relative to eccentric portions to be machined on the work in said spindles, said tools being located each side of said chucking devices and between said centers, means for rotating the carrier member, means for rotating the chucking devices in synchronism with said tools, and means for feeding said tools relative to said work.

15. In a lathe, a rotatable carrier member, a series of work spindles each comprising center drive chucking devices and centers mounted on the carrier, orbitally moving tools adapted to be fed relative to eccentric portions to be machined on the work in said spindles, some of said tools being located between said chucking devices, others located each side of said devices and between said centers, means for rotating the carrier member, means for rotating the chucking devices in synchronism with said tools, and means for feeding said tools relative to said work.

16. In a lathe, a rotatable carrier member, a series of work spindles each comprising a center drive chucking device and centers mounted on said carrier, stationary and orbitally moving tools adapted to be fed relative to concentric and eccentric portions to be machined on the work in said spindles, said tools being located each side of said chucking devices and between said centers, means for rotating the carrier member, means for rotating the chucking devices in synchronism with said orbitally moving tools, and means for feeding said tools relative to said work.

17. In a lathe, a rotatable carrier member, a series of work spindles each comprising center drive chucking devices and centers mounted on the carrier, stationary and orbitally moving tools adapted to be fed relative to concentric and eccentric portions to be machined on work in said spindles, some of said tools being located between said chucking devices, others located each side of said chucking devices and between said centers, means for rotating the carrier member, means for rotating the chucking devices in synchronism with said orbitally moving tools, and means for feeding said tools relative to said work.

18. In a lathe, a plurality of rotatable work holders, a tool holder movable relative to concentric portions of work pieces in said work holders, a tool holder movable relative to eccentric portions of said work pieces, means for moving said second mentioned tool holder in an orbital path, means for rotating said work holders in synchronism with said last mentioned means, and means for feeding said tool holders relative to said work pieces.

19. In a lathe, a plurality of rotatable work holders, a tool holder movable relative to concentric portions of work pieces in said work holders, a tool holder movable relative to eccentric portions of said work pieces, means for moving said second mentioned tool holders in an orbital path, means for actuating said work holders and said last mentioned means in synchronism, and common means for simultaneously feeding both of said tool holders relative to said work pieces.

20. In a lathe, a plurality of rotatable work holders, a tool holder movable relative to a plurality of concentric portions of work pieces in said work holders, a plurality of tool holders movable relative to a plurality of eccentric portions of said work pieces, means for moving said second mentioned tool holders in orbital paths, means for rotating said work holders and said last mentioned means in synchronism, and means for simultaneously feeding all of said tool holders relative to said work pieces.

21. In a lathe, a plurality of rotatable work holders, a plurality of tool holders movable relative to concentric portion of work pieces in said work holders, a plurality of tool holders movable relative to a plurality of angularly disposed eccentric portions of said work pieces, means for moving said second mentioned tool holders in orbital paths to follow said eccentric portions, means for rotating said work holders in synchronism with said last mentioned means, and means for simultaneously feeding all of said tool holders relative to said work pieces.

22. In a lathe, a plurality of rotatable work holders, a plurality of tool holders movable relative to a plurality of axially spaced concentric portions of work pieces in said work holders, a plurality of tool holders movable relative to a plurality of axially spaced eccentric portions of said work pieces, means for moving said second mentioned tool holders in orbital paths, and means for rotating said work holders in synchronism with said second mentioned tool holders.

23. In a lathe, means for rotating a plurality of work pieces intermediate their ends, a tool holder movable relative to concentric portions of work pieces in said means, a tool holder movable relative to eccentric portions of said work pieces, means for moving said last mentioned tool holder in an orbital path, means for operating said first mentioned means in synchronism with said last mentioned means, and means for feeding said tool holders relative to said work pieces.

24. In a lathe, a plurality of means for rotating a plurality of work pieces spaced apart axially of said work pieces, a tool holder movable relative to concentric portions of work pieces in the lathe, a tool holder movable relative to eccentric portions of said work pieces, means for moving said second mentioned tool holder in an orbital path, means for rotating said first mentioned means in synchronism with said last mentioned means, and means for feeding said tool holder relative to said work pieces.

25. In a crankshaft lathe, means for chucking and rotating a plurality of crankshafts intermediate their ends, means for supporting the ends of said crankshafts, tool feeding devices operable each side of said chucking and rotating means and between said means for supporting the ends of said crankshafts adapted to machine all the line bearing and pin bearing portions of said crankshafts, means for actuating some of said tool feeding devices in orbital movement, means for synchronizing the rotation of said chucking and rotating means with the orbital movement of some of the said tool feeding devices, and means for simultaneously feeding all of said tool feeding devices relative to said crankshafts.

26. In a crankshaft lathe, a frame, a rotatable carrier member mounted in said frame, means for supporting and rotating a plurality of crankshafts mounted on said carrier member, a pair of master crankshafts rotatably mounted for synchronous rotation in said frame, tool carrier units fixed in said frame, tool bars in said unit adapted to feed cutting tools relative to concentric portions of said work pieces, further tool carrier units mounted on the crank pins of said master crankshafts for orbital movement, tool bars mounted in said last mentioned tool carrier units adapted to feed cutting tools relative to eccentric portions of said work pieces, means for rotating said work pieces and said master crankshafts in synchronism, and common means for simultaneously feeding all of said tool bars relative to said work pieces.

27. In a lathe, a frame, rotatable carrier member mounted in said frame, a plurality of work spindles mounted on said carrier, a pair of master crankshafts rotatably mounted in said frame, means for rotating said master crankshafts and said work spindles in synchronism, tool carrier units fixed on said frame, tool bars in said units adapted to feed cutting tools relative to said concentric portions of work pieces in said spindles, orbitally moving tool feeding devices mounted on the crank pins of said master crankshafts, tool bars in said orbitally moving tool carriers adapted to feed tools relative to eccentric portions of said work pieces, means for feeding all of said tool bars relative to said work pieces comprising a master feed crankshaft, means for rotating said master feed crankshaft in synchronism with said master crankshafts and said work spindles, means for rocking said feed crankshaft about the axis of one of said master feed crankshafts, a single hydraulic motive means for rocking said feed crankshaft and means interconnecting the line bearing and pin bearing portions of said feed crankshaft with said tool bars.

28. In a lathe, a frame, a rotatable carrier member mounted in said frame, a plurality of work spindles mounted on said carrier, a semi-circular tool carrier surrounding said carrier member and said work spindles, tool bars in said tool carrier adapted to feed tools relative to said work pieces in said work spindles, and means for actuating said tool carriers to cause said tools to follow eccentric portions of said work pieces.

29. In a lathe, a frame, a plurality of work spindles mounted in said frame, a semi-circular tool carrier surrounding said work spindles, a plurality of tool bars movable in various directions in said carrier relative to said work spindles, bell crank levers pivotally mounted in said carrier and connected to said tool bars by rack and segment arrangements, means interconnecting the other ends of said bell cranks comprising arcuate actuating bars pivotally mounted on said bell cranks, means for rotating said work spindle, and means for actuating said arcuate actuating bars to cause feeding of said tool bars relative to said work spindles.

30. In a lathe, a frame, a rotatable carrier member mounted in said frame, a plurality of work spindles on said carrier, a semi-circular tool carrier surrounding said first mentioned carrier, a plurality of tool bars located in said tool carrier at indexed spaces for feeding relative to said work spindles, common means for simultaneously actuating all of said tool bars, and means for indexing said carrier member to progressively present said work spindles to said tool bars.

31. In a lathe, a frame, a rotatable carrier member mounted in said frame, a plurality of work spindles on said carrier, a semi-circular tool carrier surrounding said work spindles, a plurality of tool bars located in said tool carrier at indexed stages, means for actuating said tool bars, and means for actuating said tool carrier to cause said tool bars to follow eccentric portions on said work pieces in said spindles, and means for indexing said first mentioned carrier to progressively present said work spindles to said tool bars.

32. In a lathe, a frame, a rotatable carrier member mounted in said frame, a plurality of work spindles mounted on said carrier, a plurality of semi-circular tool holders surrounding said work spindles, some of said tool carriers being fixed on said frame, others of said carriers being moved in synchronism with eccentric portions on said work pieces in said work holders, tool bars in said tool carriers adapted to be fed relative to said work pieces, common means for actuating said tool bars and means for indexing said first mentioned carrier to progressively present said work spindles to said tool bars.

33. In a machine tool, a frame, a rotatable carrier member mounted in said frame, a plurality of work spindles on said carrier having chucking mechanism adapted to support and rotate work in a predetermined indexed position in said work spindles, orbitally moving cutting tools carried by said frame adapted to be fed relative to said work, means for rotating said carrier, and means for synchronizing the rotation of said work spindles with the orbital movement of said tools.

34. In a machine tool, a frame, a rotatable carrier member mounted in said frame, a plurality of work spindles on said carrier having chucking mechanism comprising the sole means for supporting and rotating work in a predetermined indexed position in said work spindles, orbitally moving cutting tools located at indexed stages in said frame adapted to be fed relative to eccentric portions on said work, means for indexing said carrier progressively to said stages, and means for synchronizing the rotation of said work spindles with the orbital movement of said tools.

35. In a lathe, a rotatable carrier member, a plurality of center drive work spindles on said carrier adapted to support and rotate crankshafts with all their bearing portions exposed for turning, semi-circular line bearing tool units surrounding said carrier about the line bearing portions of said crankshafts, semi-circular pin bearing tool units surrounding said carrier about the pin bearing portions of said crankshafts, and semi-circular spacer units surrounding said carrier about the center drive mechanism of said work spindles.

36. In a lathe, a frame, a rotatable carrier member mounted in said frame, a plurality of work spindles mounted on said carrier, tool carrier units, having cutting tools for machining concentric portions on work in said spindles, fixed in said frame, spacer units fixed in said frame, master crankshafts journaled in said frame and in said units, tool carrier units having cutting tools for machining eccentric portions on work in said spindles journaled on the crank pins of said master crankshafts, means for feeding said tools, and means for rotating said work spindles and master crankshafts in synchronism.

37. In a lathe, a frame, a rotatable carrier member mounted in said frame, a plurality of work spindles mounted on said carrier, master crankshafts journaled in said frame for synchronous rotation with said spindles, a tool carrier unit having cutting tools for machining concentric portions on work in said spindles, mounted on said frame and supported on a journal of a master crankshaft, and means for feeding said tools relative to said work.

38. In a lathe adapted to progressively machine eccentric portions on work pieces, a frame, a rotatable carrier member journaled in said frame, a plurality of work spindles on said carrier each comprising a pair of center drive ring gears journaled in said carrier, a pinion for each spindle rotatably mounted on said carrier to synchronize rotation of the ring gears of each work spindle, a drive shaft journaled in said carrier for synchronous rotation with orbitally moving tools for machining said eccentric portions, a plurality of driving gears rotatably mounted on said shaft, one adapted to drive one of said pinions for each of said spindles, said driving gears and said ring gears being arranged to rotate in synchronism, and means for connecting said driving gears on said shaft in a predetermined indexed position on said shaft.

39. In a lathe adapted to progressively machine eccentric portions on work pieces, a frame, a rotatable carrier member journaled in said frame, a plurality of work spindles on said carrier each comprising a pair of center drive ring gears journaled in said carrier, a pinion for each spindle rotatably mounted on said carrier to synchronize rotation of the ring gears of each work spindle, a drive shaft journaled in said carrier for synchronous rotation with orbitally moving tools for machining said eccentric portions, a plurality of driving gears rotatably mounted on said shaft, one adapted to drive one of said pinions for each of said spindles, said driving gears and said ring gears being arranged to rotate in synchronism, and means for automatically connecting said driving gears on said shaft in a predetermined indexed position on said shaft for predetermined indexed positions of said carrier in said frame.

40. In a lathe adapted to progressively machine eccentric portions on work pieces, a frame, a rotatable carrier member journaled in said frame, a plurality of work spindles on said carrier each comprising a pair of center drive ring gears journaled in said carrier, a pinion for each spindle rotatably mounted on said carrier to synchronize rotation of the ring gears of each work spindle, a drive shaft journaled in said carrier for synchronous rotation with orbitally moving tools for machining said eccentric portions, a plurality of driving gears rotatably mounted on said shaft, one adapted to drive one of said pinions for each of said spindles, said driving gears and said ring gears being arranged to rotate in synchronism, and means for automatically connecting said driving gears on said shaft in a predetermined indexed position on said shaft for predetermined indexed positions of said carrier in said frame, said last mentioned means comprising dive keys slidably mounted in said drive shaft adapted to engage a single slot in each of said driving gears, means for sliding said dive keys, and a cam fixed on said frame for actuating said last mentioned means when said carrier is rotated.

41. In a lathe, a rotatable member carrying a plurality of work holders, a series of work stations, means for rotating said rotatable member to bring said work holders selectively to said stations, an orbitally moving tool unit having cutting tools at said work stations for machining eccentric portions on work pieces in said work holders, means for rotating said work holder carrying member, and means for maintaining synchronous operation of said orbitally moving tool unit and said work spindles.

42. In a lathe, a rotatable member carrying a plurality of work holders, a series of work stations, means for rotating said rotatable member to bring said work holders selectively to said stations, cutting tools at said work stations for machining eccentric portions on work pieces in said work holders, means for rotating said work holder carrying means, common tool control means for simultaneously actuating all of said tools in orbital movement to follow said eccentric portions of the work pieces, and means for at all times maintaining synchronous operation of said work spindles and said tool control means.

43. In a machine for progressively turning crank pins on a plurality of crankshafts, a plurality of rotary work holders mounted on a rotatable carrier for rotating said crankshafts on the axis of their line bearings, a series of work stations, means for rotating said carrier to successively bring said work holders to said work stations, a series of tool units with tools located at said work stations and having feeding movements on the respective units toward the respective crank pins, means rotated to oscillate the tool frames in synchronism with the travel of the respective crank pins, a feeding member rocking on the center of rotation of the tool unit oscillating means to oscillate on said feeding member in synchronism with the tool unit oscillation and connected to the respective tools to impart correct feeding movement of the tools toward the respective crank pins.

44. In a machine for turning crank pins successively on a plurality of crankshafts, a plurality of rotary work holders mounted on a rotatable carrier for rotating the crankshafts on the axis of their line bearings, a series of work stations, means for rotating said carrier to successively bring said work holders to said work stations, a series of tool units and tools having feeding movements located at said work stations on the respective tool units, toward the respective crank pins, means to oscillate the tool units in synchronism with the travel of the respective crank pins, a feeding member mounted independently of the tool units and movable at variance with the oscillation of the tool units, and operative connections from the feeding member to the respective tools oscillating relative to but in synchronism with the respective tool units to impart correct feeding movement of the tools toward the respective crank pins.

45. In a machine for turning a crank pin successively on a plurality of crankshafts, a plurality of rotary work holders mounted on a rotatable carrier for rotating the crankshafts on the axis of their line bearings, a series of work stations, means for rotating said carrier to successively bring said work holders to said work stations, a master crank rotating in synchronism with the crank shaft, a tool unit carried by the crank pin of said master crank, a feeding member rocking coaxially with the rotation of said master crank, a second master crank rotatable on said feeding member, gears rotating with the respective master shafts and operatively connected in planetary relation, whereby said master crankshafts rotate in synchronism, a tool having a feeding movement on said tool frame toward the crankshaft crank pin to be machined, and a device operatively connected to said tool and to the crank pin of said second master crankshaft, imparting the feeding movement to said tools.

46. In a machine for turning a crank pin successively on a plurality of crankshafts, a plurality of rotary work holders mounted on a rotatable carrier, for rotating the crankshafts on the axis of their line bearings, a series of work stations, means for rotating said carrier to successively bring said work holders to said work stations, master crankshafts rotating in synchronism with said first mentioned crankshafts, a tool unit carried by the crank pin of one master crankshaft, a feeding member rocking coaxially with the rotation of said one master crankshaft, the other master crankshaft rotating in said feeding member, tools located at said work stations and having feeding movements on said tool frame toward the crank pins of the crankshafts to be machined, and a device operatively connected to said tool and the crank pin of said other master crank, imparting the feeding movement to the tools.

47. In a machine for turning a crank pin successively on a plurality of crankshafts, a plurality of rotary work holders mounted on a rotatable carrier for rotating said crankshafts on the axis of their line bearings, a series of work stations, means for rotating said carrier to successively present said work holders to said work stations, a tool unit, tools having a feeding movement on said tool unit relative to the crank pins to be machined on said crankshafts, means to oscillate said tool unit in synchronism with the rotation of said work holders, a feeding member mounted independently of the tool unit and movable at variance with the oscillation of the tool unit, and operative connection from the feeding member to the tools, oscillating relative to but in synchronism with the tool unit to impart correct feeding movement of the tools relative to the crank pins to be machined.

48. In a machine for turning a crank pin and a line bearing successively on a plurality of crankshafts, a plurality of rotary work holders mounted on a rotatable carrier for rotating said crankshafts on the axis of said line bearings, a series of work stations, means for rotating said carrier to successively present said work holders to said work stations, tool supporting mechanism with tools having feeding movements relative to said crank pin and line bearing, means to actuate said mechanism to cause tools to follow the orbital path of the crank pins, and a common means for actuating all of said tools in relative feeding movement.

49. In a machine for turning a crank pin and a line bearing successively on a plurality of crankshafts, a plurality of rotary work holders mounted on a rotatable carrier for rotating said crankshafts on the axis of said line bearings, a series of work stations, means for rotating said carrier to successively present said work holders to said work stations, a line bearing tool unit, a pin bearing tool unit, tools having a feeding movement on said tool units relative to said line bearings and crank pins, means to oscillate said pin bearing tool unit in synchronism with the rotation of said work holders, a feeding member mounted independently of the tool unit and movable at variance with the oscillation of said pin bearing tool unit, and operative connections from the feeding member to the tools, oscillating relatively to but in synchronism with the pin bearing tool unit to impart correct feeding movement of all the tools relative to the line bearings and crank pins to be machined.

50. In a machine tool, a plurality of rotary work holders, tool units, means for oscillating some of said tool units in synchronism with the rotation of the work holder, tools on said units having feeding movements relative to said work holders, a feeding member movable relative to said tool unit oscillating means, and means interconnecting said feeding member and said tools to effect simultaneous feeding of said tools during relative movement of said feeding member.

51. In a machine tool, a plurality of rotary work holders, tool units associated with said work holders, rotary means oscillating some of said units in synchronism with the rotation of the work holders, tools on the tool units having feeding movements relative to the work holders, a feeding member rocking on the axis of rotation of said tool unit oscillating means, levers operatively related to said tools, bars connected to said levers, and pivotal linkage connections connecting said bars to said feeding member oscillating on and relatively to said feeding member in synchronism with said oscillating tool units.

52. In a machine tool, a plurality of rotary work holders, tool units associated with said work holders, rotary means oscillating some of said units in synchronism with the rotation of the work holders, tools on the tool units having feeding movements relative to the work holder, a feeding member rocking on the axis of rotation of said tool unit oscillating means, fluid pressure actuated means for rocking said feeding member, means operatively connecting said feeding member to said tools, comprising pivotal linkage connections on said feeding member, oscillating on said feeding member in synchronism with the tool unit oscillation, and means for rendering said fluid pressure means operative to effect a feeding of said tools to the work holders.

53. In a machine tool, a plurality of rotatable work holders mounted on a rotatable carrier, tool units having tools movable relative to concentric portions of work pieces in said work holder, tool units having tools movable relative to eccentric portions of said work pieces, means for actuating said last mentioned tool units in orbital movement in synchronism with the work holder rotation, a feeding member movable relative to said tool units, means interconnecting said member and said tools to effect proper feeding of said tools when said feeding member is moved.

54. In a machine tool, a plurality of rotatable work holders mounted on a rotatable carrier, tool units having tools movable relative to concentric portions of work pieces in said work holder, tool units having tools movable relative to eccentric portions of said work pieces, means for actuating said last mentioned tool units in orbital movement in synchronism with the work holder rotation, a feed crankshaft movable relative to said tool units and rotatable in synchronism with said work spindles, interconnecting means between the line bearing and pin bearing portions of said feed crankshaft and the respective tools for the concentric and eccentric portions of said work pieces, and means for moving said feed crankshaft to effect a proper feeding of said tools.

WILLARD L. GROENE.